(12) United States Patent
Jiang et al.

(10) Patent No.: US 9,411,957 B2
(45) Date of Patent: Aug. 9, 2016

(54) METHOD AND DEVICE FOR OPTIMIZING AND CONFIGURING DETECTION RULE

(71) Applicant: Huawei Technologies Co., Ltd., Shenzhen (CN)

(72) Inventors: Wu Jiang, Beijing (CN); Tao Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 73 days.

(21) Appl. No.: 14/300,409

(22) Filed: Jun. 10, 2014

(65) Prior Publication Data

US 2014/0289856 A1 Sep. 25, 2014

Related U.S. Application Data

(63) Continuation of application No. PCT/CN2012/080571, filed on Aug. 24, 2012.

(30) Foreign Application Priority Data

Dec. 31, 2011 (CN) .......................... 2011 1 0459531

(51) Int. Cl.
   *H04L 29/06* (2006.01)
   *G06F 21/55* (2013.01)
   *H04L 12/26* (2006.01)

(52) U.S. Cl.
   CPC ............ *G06F 21/554* (2013.01); *G06F 21/552* (2013.01); *H04L 43/028* (2013.01); *H04L 43/18* (2013.01); *H04L 63/0236* (2013.01); *H04L 63/0263* (2013.01); *H04L 63/1416* (2013.01)

(58) Field of Classification Search
   CPC .. H04L 63/1433; H04L 63/1425; H04L 63/14
   See application file for complete search history.

(56) References Cited

U.S. PATENT DOCUMENTS 7,966,659 B1 6/2011 Wilkinson et al.
2004/0205360 A1* 10/2004 Norton ................ H04L 63/0227
726/23

(Continued)

FOREIGN PATENT DOCUMENTS

CN 1996892 A 7/2007
CN 101018121 A 8/2007

(Continued)

OTHER PUBLICATIONS

Foreign Communication From A Counterpart Application, European Application No. 12862305.5, Extended European Search Report dated Dec. 17, 2014, 6 pages.
Partial English Translation and Abstract of Chinese Patent Application No. CN1996892A, Jun. 20, 2014, 6 pages.
Foreign Communication From A Counterpart Application, PCT Application No. PCT/CN2012/080571, English Translation of International Search Report dated Nov. 29, 2012, 2 pages.

(Continued)

*Primary Examiner* — Izunna Okeke
(74) *Attorney, Agent, or Firm* — Conley Rose, P.C.; Grant Rodolph

(57) ABSTRACT

A method and a device for optimizing and configuring a detection rule, where the method includes: a network entity receives network traffic; extracts a packet from the network traffic, and identifies, according to a feature of the packet, protocol related information used in the network; saves the protocol related information and correspondence between pieces of information in the protocol related information to a first learning association table; and matches a corresponding rule from a vulnerability rule base according to the protocol related information to generate a first compact rule set. Through the generated compact rule set in the present invention, subsequent protocol detection is performed only for a protocol threat that may occur in a live network; therefore, content that needs to be detected subsequently is reduced, the detection efficiency is improved, and unnecessary performance consumption is avoided at the same time.

10 Claims, 4 Drawing Sheets

Learning association table

| Learning object | | Valid traffic threshold | Protocol | Application protocol | Traffic | Port | Application identification | Application version |
|---|---|---|---|---|---|---|---|---|
| DMZ region | IP1 | 5% (relative or absolute value) | TCP | HTTP | 50% | 80 | Apache HTTPD | 2.2.3 |
| | | | TCP | HTTP | 10% | 8080 | Apache Tomcat | 6.0.1 |
| | | | TCP | FTP | 5% | 21 | ProFTP | 1.3.0 |
| | | | UDP | NFS | 0.1% | 2049 | NFSD | V4 |
| | IP2 | | TCP | SMTP | 15% | 25 | Sendmail | 8.12.5 |
| | | | TCP | POP3 | 20% | 110 | Sendmail | 8.12.5 |

(56) References Cited

U.S. PATENT DOCUMENTS

2008/0005795 A1     1/2008   Acharya et al.
2009/0271857 A1    10/2009   Wang et al.

FOREIGN PATENT DOCUMENTS

CN         101577675 A     11/2009
WO     20110115856 A2     9/2011

OTHER PUBLICATIONS

Foreign Communication From A Counterpart Application, PCT Application No. PCT/CN2012/080571, English Translation of Written Opinion dated Nov. 29, 2012, 4 pages.

Foreign Communication From A Counterpart Application, Chinese Application No. 201110459531.3, Chinese Office Action dated Oct. 10, 2015, 6 pages.

* cited by examiner

Learning association table

Learning setting

| Learning object | | Valid traffic threshold |
|---|---|---|
| DMZ region | IP1 | 5% (relative or absolute value) |
| | IP2 | |

Learning content

| Protocol | Application protocol | Traffic | Port | Application identification | Application version |
|---|---|---|---|---|---|
| | | 0% | | | |
| | | 0% | | | |
| | | 0% | | | |
| | | 0% | | | |
| | | 0% | | | |

FIG. 2

Learning association table

| Learning object | | Valid traffic threshold | Protocol | Application protocol | Traffic | Port | Application identification | Application version |
|---|---|---|---|---|---|---|---|---|
| DMZ region | IP1 | 5% (relative or absolute value) | TCP | HTTP | 50% | 80 | Apache HTTPD | 2.2.3 |
| | | | TCP | HTTP | 10% | 8080 | Apache Tomcat | 6.0.1 |
| | | | TCP | FTP | 5% | 21 | ProFTP | 1.3.0 |
| | | | UDP | NFS | 0.1% | 2049 | NFSD | V4 |
| | IP2 | | TCP | SMTP | 15% | 25 | Sendmail | 8.12.5 |
| | | | TCP | POP3 | 20% | 110 | Sendmail | 8.12.5 |

FIG. 3

METHOD AND DEVICE FOR OPTIMIZING AND CONFIGURING DETECTION RULE

CROSS-REFERENCE TO RELATED APPLICATIONS

This application is a continuation of International Application No. PCT/CN2012/080571, filed on Aug. 24, 2012, which claims priority to Chinese Patent Application No. 201110459531.3, filed on Dec. 31, 2011, both of which are hereby incorporated by reference in their entireties.

TECHNICAL FIELD

The present invention relates to the field of detection rule configuration, and in particular, to a method and a device for optimizing and configuring a detection rule.

BACKGROUND

With the extensive application of computers and the increasing spread of networks, threats from the interior and exterior of networks are increasing. In order to protect security of a system, threat detection needs to be performed on a network. Protocol content detection is one kind of threat detection.

Taking an Intrusion Prevention System (IPS) device as an example, existing protocol content detection is mainly performed by using mode matching, that is, corresponding to different protocols, different detection rules are configured. A function of customizing a rule is provided in an IPS device, and detection is performed by adding, enabling, or closing some detection rules by a user itself. However, thousands of existing protocol types exists, and tens of thousands of specific protocol categories of the protocol types exist. Extensive experience is required for accurately configuring a detection rule, and it needs to take a lot of time. At present, most users perform detection in a manner of directly enabling all protocol detection rules. In IPS threat detection, most performance of the IPS threat detection is consumed in a protocol content detection part; therefore, in an existing manner of directly enabling all the protocol detection rules, a protocol threat that does not occur in a network is also detected, leading to consumption of many unnecessary resources by IPS, and lowering the efficiency and performance of IPS detection.

SUMMARY

The present invention provides a method and a device for optimizing and configuring a detection rule to identify, by learning traffic in a live network, protocol related information used in the live network, and generate a compact rule set according to the protocol related information, thereby enabling subsequent protocol detection to be performed only for a protocol threat that may occur in the live network; therefore, content that needs to be detected subsequently is reduced, the detection efficiency is improved, and unnecessary performance consumption is avoided at the same time.

The present invention provides a method for optimizing and configuring a detection rule, including: receiving network traffic; extracting a packet from the network traffic, and identifying, according to a feature of the packet, protocol related information used in the network; saving correspondence between the protocol related information and the protocol related information to a first learning association table; and matching a corresponding rule from a vulnerability rule base according to the protocol related information to generate a first compact rule set.

Optionally, the method further includes performing protocol threat detection according to the first compact rule set.

Optionally, the method further includes sending the first compact rule set and the first learning association table to a user, and delivering, by the user, the first compact rule set to a device when confirming the first compact rule set.

Optionally, the method further includes saving changed protocol related information to a second learning association table when the user changes the protocol related information, and matching a corresponding rule from the vulnerability rule base according to the second learning association table to generate a second compact rule set.

Optionally, the method further includes setting a learning range; and the extracting a packet from the network traffic includes extracting a packet from traffic within the learning range.

Optionally, the method further includes setting a valid traffic value range; and the extracting a packet from the network traffic includes extracting a packet of traffic within the valid traffic value range from the network traffic.

The present invention further provides a device for optimizing and configuring a detection rule, including: a traffic receiving unit configured to receive network traffic; an extraction unit configured to extract a packet from the network traffic; an information identification unit configured to identify, according to a feature of the packet, protocol related information used in the network; a first saving unit configured to save correspondence between the protocol related information and the protocol related information to a first learning association table; and a first compact rule set unit configured to match a corresponding rule from a vulnerability rule base according to the protocol related information to generate a first compact rule set.

Optionally, the device further includes a detection unit configured to perform protocol threat detection according to the first compact rule set.

Optionally, the device further includes: a sending unit configured to send the first compact rule set and the first learning association table to a user; and a receiving unit configured to, when the user confirms the first compact rule set, receive the first compact rule set delivered by the user.

Optionally, the device further includes a second saving unit configured to save changed protocol related information to a second learning association table when the user changes the protocol related information, where the first compact rule set unit is further configured to match a corresponding rule from the vulnerability rule base according to the second learning association table to generate a second compact rule set.

Optionally, the device further includes a first setting unit configured to set a learning range, where the extraction unit is further configured to extract a packet from traffic within the learning range.

Optionally, the device further includes a second setting unit configured to set a valid traffic value range, where the extraction unit is further configured to extract a packet of traffic within the valid traffic value range in the network traffic.

Compared with the prior art, the present invention has the following advantages. According to the method provided in the present invention, traffic in a live network is learned and identified to obtain protocol information used in the live network, and a detection rule is screened from a vulnerability rule base according to the protocol information, so that a generated compact rule set corresponds to a protocol used in the live network. Only the protocol used in the live network needs to be detected when detection is performed by using the compact rule set. Therefore, a problem that all protocols need to be detected during detection because a user selects all detection rules in the prior art is solved, which improves detection efficiency, and at the same time, avoid unnecessary performance consumption.

BRIEF DESCRIPTION OF DRAWINGS

To describe the technical solutions in the embodiments of the present invention more clearly, the following briefly introduces accompanying drawings required for describing the embodiments. The accompanying drawings in the following description show merely some embodiments of the present invention, and a person of ordinary skill in the art may still derive other drawings from these accompanying drawings without creative efforts.

FIG. 2 is a schematic diagram of a first learning association table before traffic learning according to an embodiment of the present invention;

FIG. 3 is a schematic diagram of a first learning association table after traffic learning according to an embodiment of the present invention.

DESCRIPTION OF EMBODIMENTS

The following clearly describes the technical solutions in the embodiments of the present invention with reference to the accompanying drawings in the embodiments of the present invention. The embodiments to be described are merely a part rather than all of the embodiments of the present invention. All the other embodiments obtained by a person skilled in the art based on the embodiments of the present invention shall fall within the protection scope of the present invention.

Figure 1:
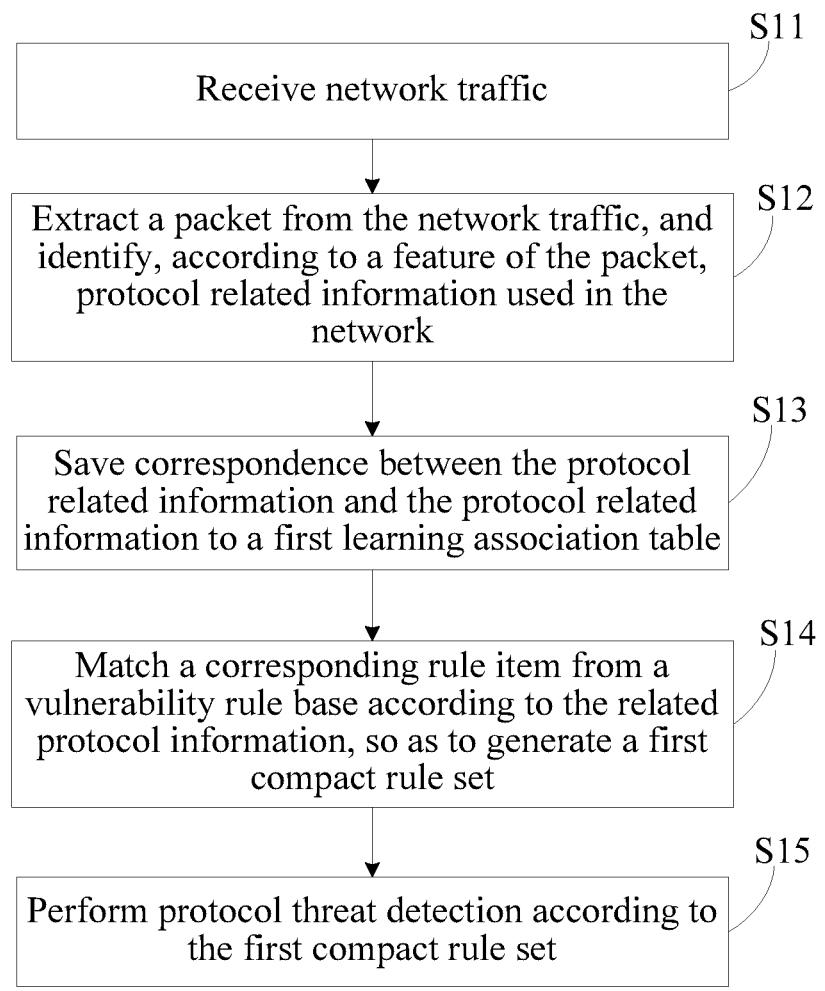
FIG. 1 is a flowchart of Embodiment 1 of a method according to the present invention.

Referring to FIG. 1, Embodiment 1 of the present invention provides a method for optimizing and configuring a detection rule, where the method includes:

S11: Receive network traffic.

Taking an IPS device as an example, a mode matching manner is used for protocol detection of the IPS device. That is to say, for different protocols, there are different detection rules. It is known that, different vulnerabilities exist in different protocols, and a threat of a protocol comes from an attack to these vulnerabilities. Therefore, when a protocol is detected, only a corresponding vulnerability detection rule needs to be matched. Therefore, in order to correctly match a vulnerability detection rule, a protocol type used in a live network needs to be known first.

Specifically, traffic in an actual network may be learned at an earlier stage when the IPS device accesses the network.

S12: Extract a packet from the network traffic, and identify, according to a feature of the packet, protocol related information used in the network.

The protocol related information specifically includes one piece of or a combination of more pieces of information such as a protocol name, an application protocol name, that is, an application type, a port number, a server software name, and a server software version.

In order to correctly transfer a packet, related information of protocol by which the packet is transferred will be set in the packet. Therefore, a packet may be extracted from traffic obtained in a learning process, and feature identification is performed on the packet to obtain protocol related information. Specifically, a protocol name and an application type may be identified according to a feature of the packet. Deep analysis is further performed on the application type to obtain information of a port number, a server software name, and a server software version. The protocol related information are related to storage information of a vulnerability rule base that is mentioned subsequently. A specific relationship between learned protocol information and rule information in the rule base is described in subsequent content.

S13: Save the protocol related information and correspondence between the protocol related information to a first learning association table.

Information corresponding to a same piece of traffic is associatively stored when the obtained protocol related information is stored. For example, a piece of traffic is identified and it is obtained that a protocol of the piece of traffic is transport control protocol (TCP), an application protocol of the piece of traffic is hypertext transfer protocol (HTTP), a port of the piece of traffic is 80, a server software name of the piece of traffic is Apache Hypertext Transfer Protocol Daemon HTTPD, and a server software version is 2.2.3. Therefore, not only the foregoing information needs to be stored in the first learning association table, but also correspondence between the foregoing information needs to be stored.

Generally, a user transmits data only in a certain network range. Therefore, a protocol beyond the network range is not used, and a protocol type used beyond the network range does not need to be detected. Therefore, in Embodiment 2 of the present invention, a learning range may be preset to learn specified traffic. In this case, only a packet of traffic in the learning range needs to be extracted for identification, and then obtained protocol related information is stored in the first learning association table. Specifically, a network segment or an Internet Protocol (IP) address that is to be learned may be set. During specific implementation, a manner of setting multiple options for the user to select may be used, and a manner of inputting by the user itself may also be used. When the user does not select an option or does not input, traffic in the whole network may be set for learning.

S14: Match a corresponding rule from a vulnerability rule base according to the protocol related information to generate a first compact rule set.

The vulnerability rule base is a system security evaluation tool, and stores a vulnerability rule corresponding to each protocol. For example, a vulnerability rule base stores the following:

[Mail service] SendMail 7.0: 300 vulnerability rules;
[Mail service] SendMail 8.0: 200 vulnerability rules;
[Mail service] Exchange Server 2007: 500 vulnerability rules;
[Mail service] Exchange Server 2010: 300 vulnerability rules;
[FTP service] ProFTP 1.2.0: 1000 vulnerability rules; and
[FTP service] ProFTP 1.3.0: 500 vulnerability rules.

It can be seen from the foregoing description, in the vulnerability rule base, a vulnerability rule, that is, a detection rule, is set corresponding to protocol information such as an application protocol, an application server software name, and an application server software version. Therefore, a corresponding vulnerability rule can be obtained according to identified protocol information. For example, the identified protocol information is that, the application protocol is file transfer protocol (FTP), the application server software name is ProFTP, and the version is 1.2.0, so that 1000 corresponding detection rules exist.

When multiple sets of protocol information are identified, corresponding detection rules are obtained from the vulnerability rule base for integration to form the first compact rule set.

In some situations, the user only expects to protect and detect traffic in a certain value range, for example, large traffic, without caring about other traffic. Therefore, in Embodiment 3 of the present invention, the method further includes setting a valid traffic value range. For example, the range is set to 5%-80%. Sometimes, when traffic that the user expects to protect is in several discontinuous ranges, multiple ranges may be set, for example, 5%-30%, and 45%-90%.

In a specific application, the user does not care about small traffic. Therefore, a detection range may be set in a manner of setting a threshold. For example, 5% is set, so that traffic lower than 5% is a range that the user does not care about and does not expect to protect. Therefore, the user may only extract a packet of traffic within the valid traffic value range from the network traffic, and perform identification to obtain corresponding protocol information, and then save the protocol information.

In the present invention, sometimes, traffic identification is performed before statistics on a value of traffic is collected, that is, the corresponding protocol information is obtained by identifying the feature of the packet before a size of traffic can be known. In this case, all identified corresponding protocol information needs to be first stored in the first learning association table, and the size of the traffic, on which statistics is collected subsequently, is also correspondingly stored in the first learning association table.

Then, traffic with a size beyond the set valid value range and protocol information corresponding to the traffic beyond the set valid value range are deleted from the first learning association table according to the set valid traffic value range to generate a new learning association table. In addition, a rule is screened from the vulnerability rule base according to the new learning association table to generate a compact rule set.

The essence of Embodiment 2 and Embodiment 3 of the present invention is to set a network address range and a size range for the traffic. Two setting manners may be performed respectively, and may also be performed at the same time.

The generated compact rule set may be directly applied to a device. The user may view a specific optimization and configuration record through log information. In order to ensure the accuracy, in Embodiment 4 of the present invention, the compact rule set may be first sent to the user, and be finally confirmed by the user. A specific process is described as follows.

The first compact rule set and the first learning association table are sent to the user.

Specifically, the user may know, by viewing information in the first learning association table, whether a learning result of the device is consistent with an actual network environment. In order to obtain a more accurate result, obtained traffic value information may be stored in the first learning association table at the same time at a learning stage of the device.

It should be noted that, in a situation in which the learning range and the valid traffic value range are set, the user only checks information in the set ranges when viewing information.

The user delivers the first compact rule set to the device when confirming the first compact rule set.

When the learning result, that is, the information in the first learning association table, is consistent with the actual network environment, the user sends confirmation information and delivers the first compact rule set to the device.

When considering, by viewing, that the information in the first learning association table is not consistent with the actual network environment, the user may make a change as required, and the device stores the changed protocol related information to a second learning association table, and generates a second compact rule set according to the second learning association table.

In the embodiment of the present invention, referring to FIG. 1, the method further includes:

S15: Perform protocol threat detection according to the first compact rule set.

An ultimate objective of configuring the compact rule set is to provide a rule for an IPS device to perform protocol detection. Therefore, protocol detection is performed according to a compact rule set after the compact rule set is generated in the IPS device.

In Embodiment 5 of the present invention, that a set learning range is a network segment Demilitarized Zone (DMZ), an IP address is IP1-IP2, and a valid traffic threshold is 5% is taken as an example to describe the process of the present invention in detail.

First, DMZ, IP1-IP2, and 5% are input by the user in the blanks corresponding to a network segment, an IP address, and a valid traffic threshold.

After the setting is completed, the IPS device generates the first learning association table to make preparation for subsequent work. As shown in FIG. 2, the generated first learning association table includes two parts: learning setting and learning content. The learning setting part is divided into two columns: a learning object and a valid traffic threshold. The learning content part is divided into a total of 6 columns of content: a protocol, an application protocol, traffic, a port, server software, and an application version. The column of traffic represents a value of traffic, of which an initial value is 0%.

After receiving traffic of the live network, the IPS device first screens the traffic and ignores traffic beyond ranges of DMZ and IP1-IP2. Then, a packet is extracted from the traffic, and feature identification is performed on the packet to obtain information of a protocol and an application protocol. Deep analysis is performed on the application protocol, and information, such as a server software name, a version, and a port that is used in the application protocol, is identified. The foregoing information is correspondingly stored in the first learning association table. Statistics on traffic value information is collected, and the traffic value information is correspondingly stored in the first learning association table. In this case, in the first learning association table shown in FIG. 3, obtained corresponding information is stored in a corresponding column.

Traffic lower than 5% and other information corresponding to the traffic are deleted from the first learning association table. That is to say, in FIG. 3, traffic being 0.1% and corresponding protocol information are deleted.

The vulnerability rule base provided in the present invention is as follows:

[Web service] Apache 1.0: 5000 vulnerability rules;
[Web service] Apache 2.0: 3000 vulnerability rules;
[Web service] Apache HTTPD 2.2.3: 1000 vulnerability rules;
[Web service] Apache Tomcat 5.0: 500 vulnerability rules;
[Web service] Apache Tomcat 6.0.1: 500 vulnerability rules;
[Web service] IIS 1.0: 3000 vulnerability rules;
[Web service] IIS 2.0: 2000 vulnerability rules;

[FTP service] ProFTP 1.2.0: 1000 vulnerability rules;
[FTP service] ProFTP 1.3.0: 500 vulnerability rules;
[Mail service] SendMail 7.0: 300 vulnerability rules;
[Mail service] SendMail 8.0: 200 vulnerability rules;
[Mail service] Exchange Server 2007: 500 vulnerability rules;
[Mail service] Exchange Server 2010: 300 vulnerability rules;
[Database service] MySQL 4.0: 1000 vulnerability rules;
[Database service] MySQL 4.1: 500 vulnerability rules;
[Database service] MySQL 5.0: 500 vulnerability rules;
[Database service] MySQL 5.1: 300 vulnerability rules;
[Database service] SQLServer 2000: 300 vulnerability rules;
[Database service] SQLServer 2005: 200 vulnerability rules; and
[Database service] SQLServer 2008: 250 vulnerability rules.

An HTTP application protocol corresponds to a Web service, an FTP application protocol corresponds to an FTP service, a network file system (NFS) application protocol corresponds to an NFS service, and Simple Network Time Protocol (SMTP) and Post Office Protocol 3 (POP3) application protocols correspond to a mail service.

Then, a corresponding rule set is extracted:

Related to a Web service: the following rules are extracted from the vulnerability rule base according to learning results Apache HTTPD 2.2.3 and Apache Tomcat 6.0.1:
[Web service] Apache HTTPD 2.2.3: 1000 vulnerability rules; and
[Web service] Apache Tomcat 6.0.1: 500 vulnerability rules.

Related to an FTP service: the following rules are extracted from the vulnerability rule base according to a learning result ProFTP 1.3.0:
[FTP service] ProFTP 1.3.0: 500 vulnerability rules.

Related to a mail service: at the learning stage, it is found that mail protocol traffic exists; however, specifically used software is not identified; therefore, all mail vulnerability rules are extracted from the vulnerability rule base:
[Mail service] SendMail 7.0: 300 vulnerability rules;
[Mail service] SendMail 8.0: 200 vulnerability rules;
[Mail service] Exchange Server 2007: 500 vulnerability rules; and
[Mail service] Exchange Server 2010: 300 vulnerability rules.

Related to a database service: no database service traffic is found at the learning stage; therefore, it is considered that the service does not exist in the actual network, and a rule corresponding to the database service is not extracted.

The foregoing extracted rules are summarized into the following rule set:
[Web service] Apache HTTPD 2.2.3: 1000 vulnerability rules;
[Web service] Apache Tomcat 6.0.1: 500 vulnerability rules;
[FTP service] ProFTP 1.3.0: 500 vulnerability rules;
[Mail service] SendMail 7.0: 300 vulnerability rules;
[Mail service] SendMail 8.0: 200 vulnerability rules;
[Mail service] Exchange Server 2007: 500 vulnerability rules; and
[Mail service] Exchange Server 2010: 300 vulnerability rules.

Finally, the learning result and the compact rule set are pushed to the user together for confirmation, and, after confirmation, are delivered to the IPS device for protocol detection.

To sum up, according to the method provided in the present invention, traffic in a live network is learned and identified to obtain protocol information used in the live network, and a detection rule is screened from a vulnerability rule base according to the protocol information, so that a generated compact rule set corresponds to a protocol used in the live network. Only the protocol used in the live network needs to be detected when detection is performed by using the compact rule set. Therefore, a problem that all protocols need to be detected during detection because a user selects all detection rules in the prior art is solved, which improves detection efficiency, and at the same time, avoid unnecessary performance consumption. In addition, a protocol used in a network is often changed, and the user is difficult to perceive that; therefore, by using the method in the present invention, a configured compact rule set can correspond to a currently used protocol type in real time.

Figure 4:
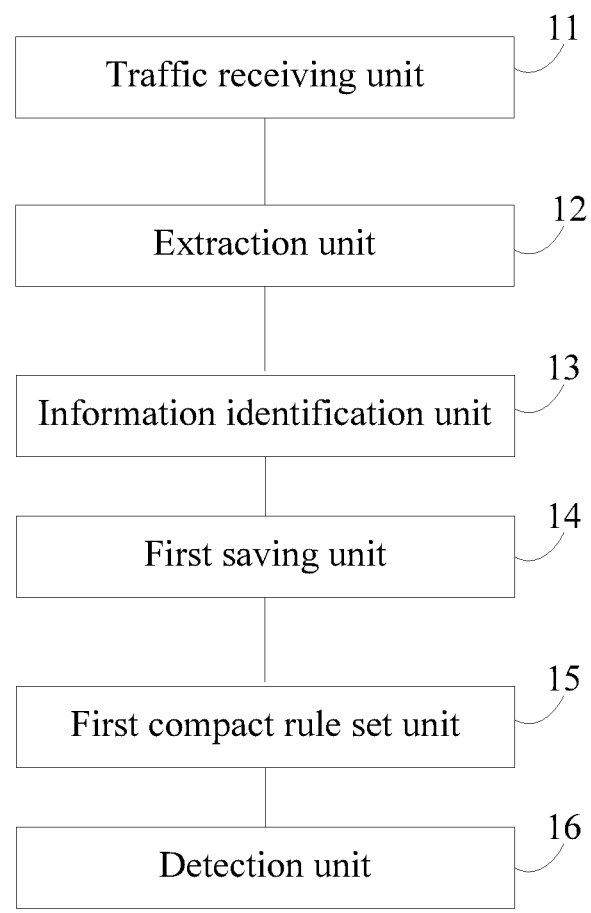
FIG. 4 is a structural diagram of a device according to the present invention.

Referring to FIG. 4, Embodiment 6 of the present invention further provides a device for optimizing and configuring a detection rule, where the device includes the following units:

A traffic receiving unit 11 is configured to receive network traffic.

An extraction unit 12 is configured to extract a packet from the network traffic.

Generally, a user transmits data only in a certain network range. Therefore, a protocol beyond the network range is not used, and a protocol type used beyond the network range does not need to be detected. Therefore, in the embodiment of the present invention, the device further includes a first setting unit, which is configured to set a learning range. The extraction unit is further configured to extract a packet from traffic within the learning range. Specifically, a network segment or an IP address that is to be learned may be set. During specific implementation, a manner of setting multiple options for the user to select may be used, and a manner of inputting by the user itself may also be used. When the user does not select an option or does not input, traffic in the whole network may be set for learning.

An information identification unit 13 is configured to identify, according to a feature of the packet, protocol related information used in the network, where the related information includes a protocol name, an application type, a port number, a server software name, and a server software version.

A first saving unit 14 is configured to save protocol related information and correspondence between the protocol related information to a first learning association table.

A first compact rule set unit 15 is configured to match a corresponding rule from a vulnerability rule base according to the protocol related information to generate a first compact rule set.

In some situations, the user only expects to protect and detect traffic in a certain value range, for example, large traffic, without caring about other traffic. Therefore, in another embodiment of the present invention, the device further includes a second setting unit configured to set a valid traffic value range.

The extraction unit is further configured to extract a packet of traffic within the valid traffic value range from the network traffic.

In the present invention, sometimes, traffic identification is performed before statistics on a value of traffic is collected, that is, the corresponding protocol information is obtained by identifying the feature of the packet before a size of traffic can be known. In this case, all identified corresponding protocol information needs to be first stored in the first learning association table, and the size of the traffic, on which statistics is collected subsequently, is also correspondingly stored in the first learning association table.

Then, traffic beyond the set valid value range and corresponding protocol information are deleted from the first learning association table according to the set valid traffic value range to generate a new learning association table. In addition, a rule is screened from the vulnerability rule base according to the new learning association table to generate a compact rule set.

The generated compact rule set may be directly applied to a device. The user may view a specific optimization and configuration record through log information. In order to ensure the accuracy, in a specific embodiment of the present invention, the device further includes the following units:

A sending unit is configured to send the first compact rule set and the first learning association table to the user.

Specifically, the user may know, by viewing information in the first learning association table, whether a learning result of the device is consistent with an actual network environment. In order to obtain a more accurate result, obtained traffic value information may be stored in the first learning association table at the same time at a learning stage of the device.

It should be noted that, in a situation in which the learning range and the valid traffic value range are set, the user only checks information in the set ranges when viewing information.

A receiving unit is configured to, when the user confirms the first compact rule set, receive the first compact rule set delivered by the user.

When the learning result, that is, the information in the first learning association table, is consistent with the actual network environment, the user sends confirmation information and delivers the first compact rule set to the device.

When the user considers, by viewing, that the information in the learning association table is not consistent with the actual network environment, the device further includes a second saving unit, which is configured to save changed protocol related information to a second learning association table when the user changes the protocol related information.

The compact rule set unit is further configured to screen a rule from the vulnerability rule base according to the second learning association table to generate a second compact rule set.

An ultimate objective of configuring the compact rule set is to provide a rule for an IPS device to perform protocol detection. Therefore, in the embodiment of the present invention, referring to FIG. 4, the device further includes a detection unit 16 configured to perform protocol threat detection according to the first compact rule set.

A person of ordinary skill in the art may understand that, all or a part of the steps of the foregoing method embodiments may be implemented by a program instructing relevant hardware. The foregoing programs may be stored in a computer readable storage medium. When the program runs, the foregoing steps of the method embodiments are performed. The foregoing storage medium includes various mediums capable of storing program code, such as a read-only memory (ROM), a random access memory (RAM), a magnetic disk, or an optical disc.

The foregoing describes the method and the device for optimizing and configuring a detection rule provided in the present invention in detail. The principle and implementation manners of the present invention are described through specific embodiments herein. In the foregoing embodiments, the description of each embodiment has respective emphasis. For a part that is not described in detail in a certain embodiment, reference may be made to related description in another embodiment. The description about the embodiments of the present invention is merely intended to facilitate understanding of the method and core ideas of the present invention. Meanwhile, a person of ordinary skill in the art may make variations and modifications to the present invention in terms of the specific implementations and application scopes according to the ideas of the present invention. To sum up, the content of the specification should not be understood as a limitation to the present invention.

What is claimed is:

1. A method performed by a network entity for optimizing and configuring a detection rule, comprising:
    receiving network traffic from a network device;
    extracting a plurality of packets from the network traffic;
    identifying protocol related information in the packets, wherein the protocol related information includes one or more of a protocol name, an application protocol name, a port number, a server software name, and a server software version;
    saving the protocol related information in a memory of the network entity;
    obtaining a first vulnerability rule corresponding to the protocol related information from a vulnerability rule base stored in the memory, wherein the first vulnerability rule is set corresponding to the protocol information in the vulnerability rule base; and
    performing protocol threat detection according to the obtained first vulnerability rule;
    the method further comprising setting a valid traffic percentage range, wherein extracting the packets from the network traffic comprises extracting the packets of at least one application protocol from the network traffic and wherein a percentage of traffic of each application protocol in the at least one application protocol from the network traffic is within the valid traffic percentage range.

2. The method according to claim 1, further comprising:
    sending the identified protocol related information and the obtained first vulnerability rule to a user; and
    receiving a confirmed vulnerability rule delivered from the user when the user confirms the obtained first vulnerability rule.

3. The method according to claim 2, further comprising:
    saving changed protocol related information when the user changes the protocol related information;
    obtaining a second vulnerability rule from the vulnerability rule base according to the changed protocol related information; and
    performing protocol threat detection according to the second vulnerability rule which is obtained according to the changed protocol related information.

4. The method according to claim 1, further comprising setting a learning range, wherein the learning range comprises a network segment or an Internet Protocol (IP) address that is determined in advance, and wherein extracting the packets from the network traffic comprises extracting, from the network traffic, the packets with a carried address within the learning range.

5. The method according to claim 1, wherein after saving the protocol related information in a memory of the network entity, the method further comprises deleting, from the memory, protocol related information corresponding to traffic from the network traffic beyond the valid traffic percentage range.

6. A device for optimizing and configuring a detection rule, comprising:

a processor; and a memory coupled to the processor and comprising instructions which, when executed by the processor, cause the processor to:

receive network traffic from a network device;

extract a plurality of packets from the network traffic;

identify, protocol related information in the packets, wherein the protocol related information includes one or more of a protocol name, an application protocol name, a port number, a server software name, and a server software version;

save the protocol related information in a memory of the device;

obtain a first vulnerability rule corresponding to protocol related information from a vulnerability rule base stored in the memory, wherein the first vulnerability rule is set corresponding to the protocol information in the vulnerability rule base; and perform protocol threat detection according to the obtained first vulnerability rule;

the instructions further cause the processor to:

set a valid traffic percentage range;

wherein extracting the packets from the network traffic comprises:

extract the packets of at least one application protocol from the network traffic, and wherein a percentage of traffic of each application protocol in the at least one application protocol from the network traffic is within the valid traffic percentage range.

7. The device according to claim 6, wherein the instructions further cause the processor to:

send the identified protocol related information and the obtained first vulnerability rule to a user; and receive a confirmed vulnerability rule delivered by the user when the user confirms the obtained first vulnerability rule.

8. The device according to claim 7, wherein the instructions further cause the processor to:

save changed protocol related information in the memory of the device when the user changes the protocol related information, obtain a second vulnerability rule from the vulnerability rule base according to the changed protocol related information; and perform protocol threat detection according to the second vulnerability rule which is obtained according to the changed protocol related information.

9. The device according to claim 6, wherein the instructions further cause the processor to:

set a learning range, wherein the learning range comprises a network segment or an Internet Protocol (IP) address that is determined in advance; and extract, from the network traffic, the packets with a carried address within the learning range.

10. The device according to claim 6, wherein the instructions further cause the processor to:

delete, from the memory, protocol related information corresponding to traffic from the network traffic beyond the valid traffic percentage range.

* * * * *